United States Patent
Mellander

(10) Patent No.: US 8,910,815 B2
(45) Date of Patent: Dec. 16, 2014

(54) COVER FOR FUEL SYSTEM COMPONENT AND METHOD OF MAKING

(75) Inventor: Carl-Hugo M. Mellander, Ettlingen (DE)

(73) Assignee: TI Group Automotive Systems, L.L.C., Warren, MI (US)

( * ) Notice: Subject to any disclaimer, the term of this patent is extended or adjusted under 35 U.S.C. 154(b) by 1070 days.

(21) Appl. No.: 12/102,476

(22) Filed: Apr. 14, 2008

(65) Prior Publication Data
US 2009/0256317 A1 Oct. 15, 2009

(51) Int. Cl.
*B65D 53/00* (2006.01)
*B60K 15/03* (2006.01)

(52) U.S. Cl.
CPC ..................... *B60K 15/03* (2013.01)
USPC ............ 220/234; 220/806; 220/795

(58) Field of Classification Search
CPC ...... B65D 53/00; B65D 53/08; B65D 41/005; B65D 51/14; B65D 59/06
USPC .............. 220/234, 203.05, 203.22, 222, 233, 220/324, 203.09, 226, 254.7, 795, 363, 223, 220/224, 806; 24/442, 297, 453, 618; 277/642
See application file for complete search history.

(56) References Cited

U.S. PATENT DOCUMENTS

| | | | |
|---|---|---|---|
| 3,467,448 A | 9/1969 | Galle | |
| 3,788,654 A | 1/1974 | Mandley | |
| 3,909,017 A * | 9/1975 | Engstrom | 277/586 |
| 3,918,726 A | 11/1975 | Kramer | |
| 4,248,439 A | 2/1981 | Haslett | |
| 4,262,914 A | 4/1981 | Roley | |
| 4,344,629 A | 8/1982 | Oelke | |
| 4,364,572 A | 12/1982 | Yamamoto et al. | |
| 4,426,091 A | 1/1984 | Baylor | |
| 4,568,090 A | 2/1986 | Westemeier | |
| 4,813,690 A | 3/1989 | Coburn, Jr. | |
| 5,211,304 A * | 5/1993 | Stolzman | 220/304 |
| 5,234,039 A | 8/1993 | Aoshima et al. | |
| 5,265,890 A | 11/1993 | Balsells | |
| 5,330,068 A | 7/1994 | Duhaime et al. | |
| 5,511,518 A * | 4/1996 | Jain et al. | 123/90.37 |
| 5,860,680 A | 1/1999 | Drijver et al. | |
| 5,879,010 A | 3/1999 | Nikanth et al. | |
| 5,913,441 A | 6/1999 | Voirol | |
| 5,944,323 A | 8/1999 | Cavka | |
| 6,012,904 A | 1/2000 | Tuckey | |
| 6,065,627 A * | 5/2000 | Johanson | 220/304 |
| 6,091,175 A | 7/2000 | Kinsinger | |
| 6,305,483 B1 | 10/2001 | Portwood | |
| 6,332,555 B1 * | 12/2001 | Stangier | 220/562 |
| 6,357,618 B1 * | 3/2002 | Kloess et al. | 220/562 |
| 6,357,759 B1 | 3/2002 | Azuma et al. | |

(Continued)

FOREIGN PATENT DOCUMENTS

JP 2004278622 10/2004
JP 2005016651 1/2005

*Primary Examiner* — Luan K Bui
*Assistant Examiner* — Rafael Ortiz
(74) *Attorney, Agent, or Firm* — Reising Ethington P.C.

(57) ABSTRACT

One embodiment of a cover for use in a fuel system component has a body and a seal molded around the body. The body has at least one first connecting feature that is complementary to at least one second connecting feature of the seal. The first connecting feature and the second connecting feature help hold the body and the seal together.

18 Claims, 4 Drawing Sheets

(56) References Cited

U.S. PATENT DOCUMENTS

| | | |
|---|---|---|
| 6,357,760 B1 | 3/2002 | Doyle |
| 6,419,236 B1 | 7/2002 | Janian |
| 6,450,502 B1 | 9/2002 | Baehl et al. |
| 6,497,415 B2 | 12/2002 | Castleman et al. |
| 6,502,826 B1 | 1/2003 | Schroeder et al. |
| 6,533,288 B1 | 3/2003 | Brandner et al. |
| 6,691,888 B2 * | 2/2004 | Moser et al. .................. 220/562 |
| 6,698,613 B2 * | 3/2004 | Goto et al. .................. 220/562 |
| 6,755,422 B2 | 6/2004 | Potter |
| 6,854,739 B2 | 2/2005 | Schleth et al. |
| 7,134,671 B2 | 11/2006 | Duke et al. |
| 7,140,617 B2 | 11/2006 | Popielas et al. |
| 7,308,738 B2 * | 12/2007 | Barvosa-Carter et al. ...... 24/442 |
| 2002/0017527 A1 * | 2/2002 | Goto et al. .................... 220/659 |
| 2002/0053769 A1 | 5/2002 | Oiarbide Aseguinolaza |
| 2002/0158419 A1 | 10/2002 | Zitting et al. |
| 2004/0239047 A1 | 12/2004 | Kent et al. |
| 2005/0012280 A1 | 1/2005 | Richardson |
| 2008/0000906 A1 * | 1/2008 | Nicosia et al. ................ 220/304 |
| 2009/0120940 A1 * | 5/2009 | Shah ............................. 220/363 |
| 2010/0293775 A1 * | 11/2010 | Barvosa-Carter et al. ...... 29/525 |

* cited by examiner

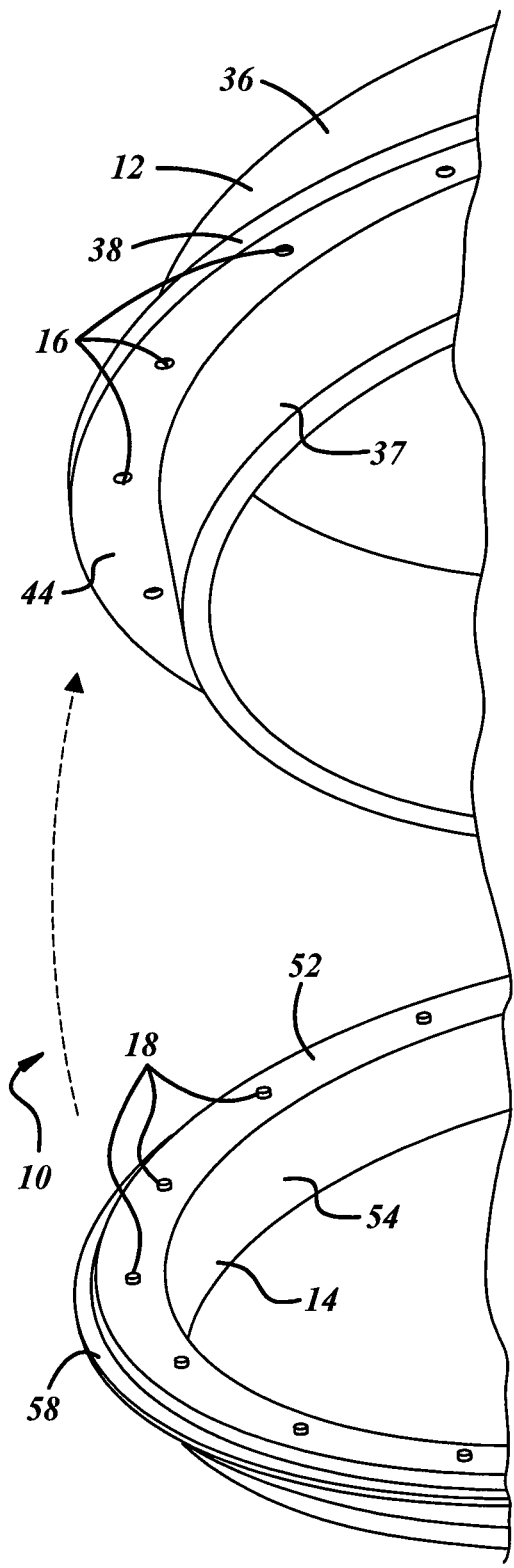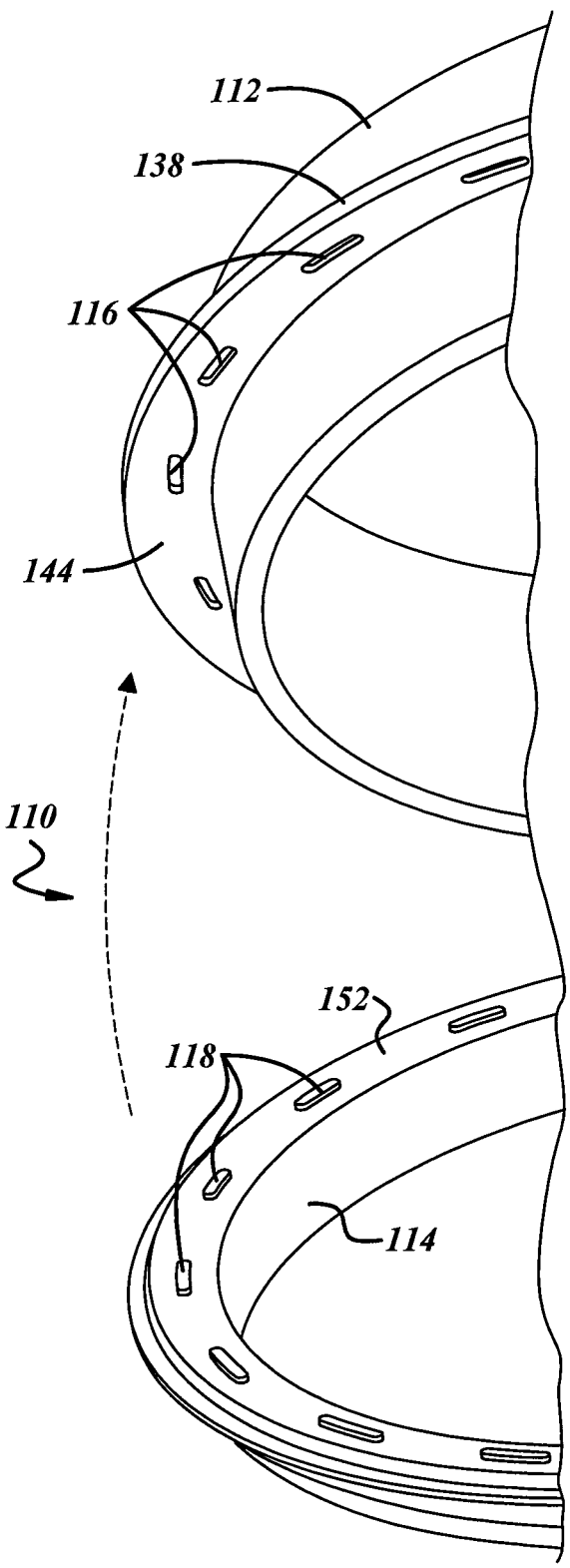
*FIG. 3A*   *FIG. 3B*

COVER FOR FUEL SYSTEM COMPONENT AND METHOD OF MAKING

FIELD OF THE INVENTION

The invention relates generally to a cover for an opening in a fuel system component, and more particularly to a seal of the cover and a method of making both.

BACKGROUND OF THE INVENTION

Many automotive fuel systems include a fuel tank for storing fuel that is eventually consumed by an internal combustion engine. A fuel delivery module comprising, among other things, a reservoir and a fuel pump, may be mounted or suspended within the fuel tank through an opening in a fuel tank wall. Oftentimes the fuel delivery module includes a cover or mounting flange mated with the fuel tank opening to close the opening and prevent fuel liquid and fuel vapor form escaping therethrough. Such covers or mounting flanges are mated with the openings with one or more separately mounted seals between the covers or mounting flanges and the openings. To provide an effective seal, the seals must be positioned and retained within close tolerances.

SUMMARY OF THE INVENTION

One embodiment of a cover for an opening in a fuel system component may include a body and a seal that is molded to the body. The body and the seal may have complementary connecting features to help hold them together. In one implementation, the body may have at least one first connecting feature, and the seal may have at least one second connecting feature.

One embodiment of an assembly may include a fuel system component and a cover. The cover may at least partially close an opening in the fuel system component and may include a body with a radial flange that has at least one first connecting feature. The cover may also include a seal that is molded to the radial flange. The seal may have at least one second connecting feature that connects with the at least one first connecting feature to help hold the seal to the body.

One embodiment of a method of forming a cover for a fuel system component may include molding a first material into a first predetermined shape that defines a body. The body may have at least one first connecting feature. The method may also include molding a second material around the body of the first material as to be in contact with the at least one first connecting feature. The method may further include allowing the second material to solidify into a second predetermined shape that defines a seal having at least one second connecting feature that is formed at the at least one first connecting feature and connects therewith.

BRIEF DESCRIPTION OF THE DRAWINGS

The following detailed description of preferred embodiments and best mode will be set forth with reference to the accompanying drawings, in which:

FIG. 3A is an exploded perspective view of a first example cover;

FIG. 3B is an exploded perspective view of a second example cover;

DETAILED DESCRIPTION OF PREFERRED EMBODIMENTS

Figure 1:
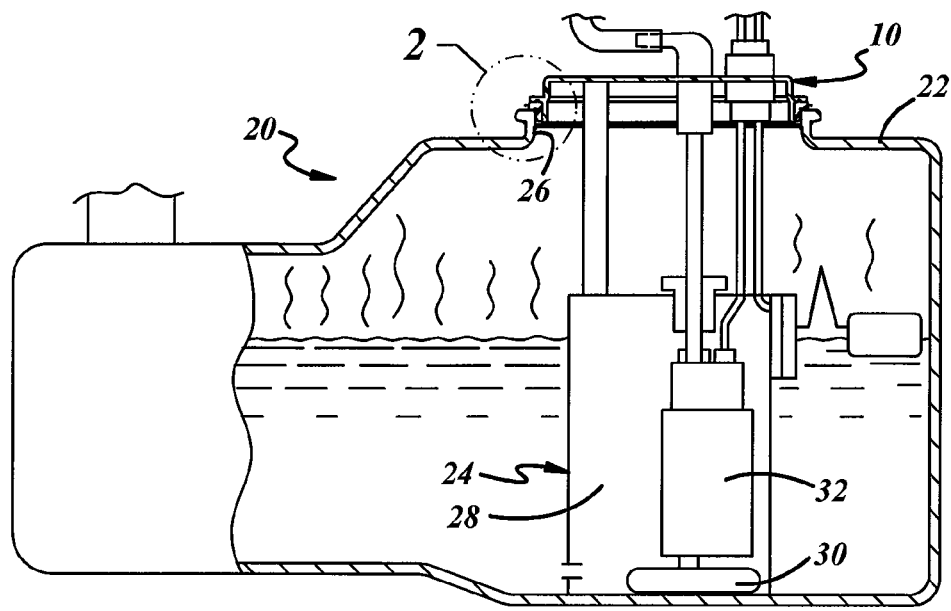
FIG. 1 is a partial sectional view of a fuel tank assembly including a fuel delivery module and a cover.

In general, and before referring to the drawing figures, various example embodiments of a cover are shown and described. The cover shown has a circular and cylindrical shape, and thus inherently defines an imaginary axis, an imaginary radius, and an imaginary circumference. In this regard, the term "axially" describes a direction generally parallel to the axis, "radially" describes a direction generally parallel to or along the radius from the axis, and "circumferentially" describes a direction generally along the circumference. Nonetheless, the cover need not be circular and instead could be any shape. For example, the cover could be rectangular in which case the terms axially, radially, and circumferentially would describe equivalent directions.

Figure 2:
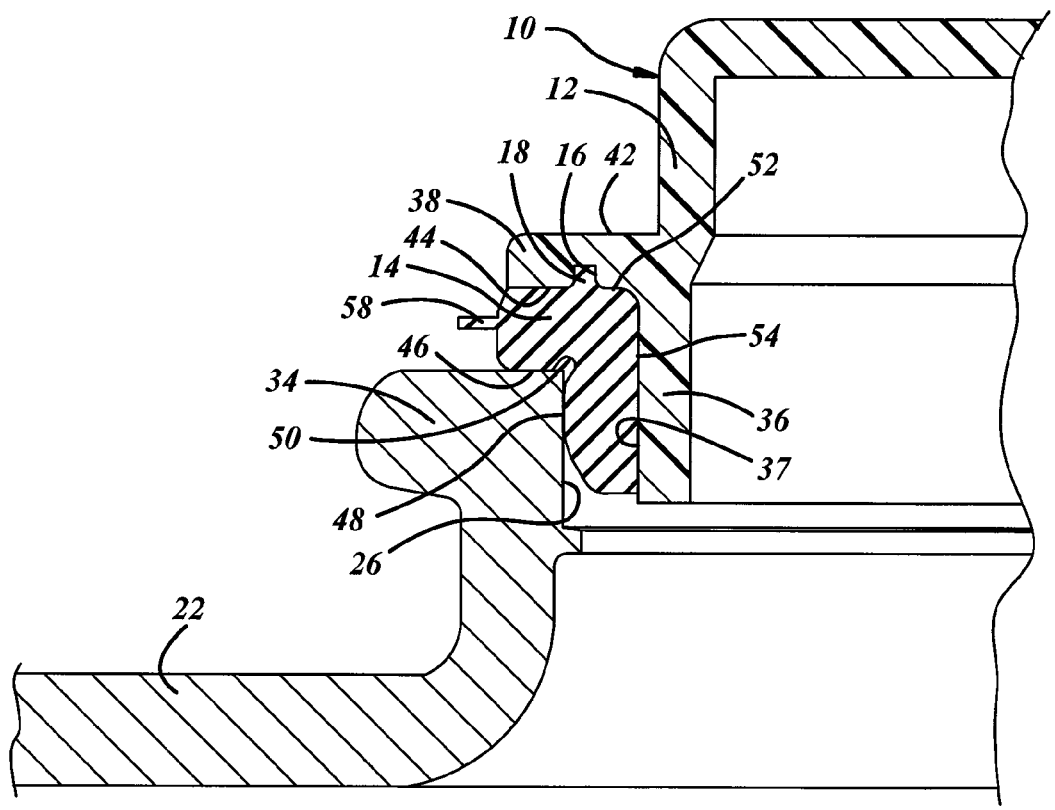
FIG. 2 is an enlarged fragmentary sectional view of the encircled portion 2 of FIG. 1, showing a seal in a substantially uncompressed state.
Figure 3C:
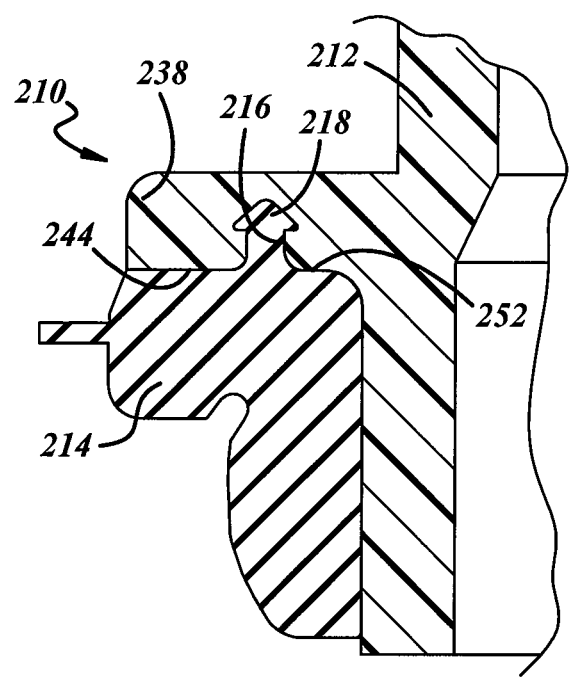
FIG. 3C is a fragmentary sectional view of a third example cover, showing a seal in a substantially uncompressed state.
Figure 3D:
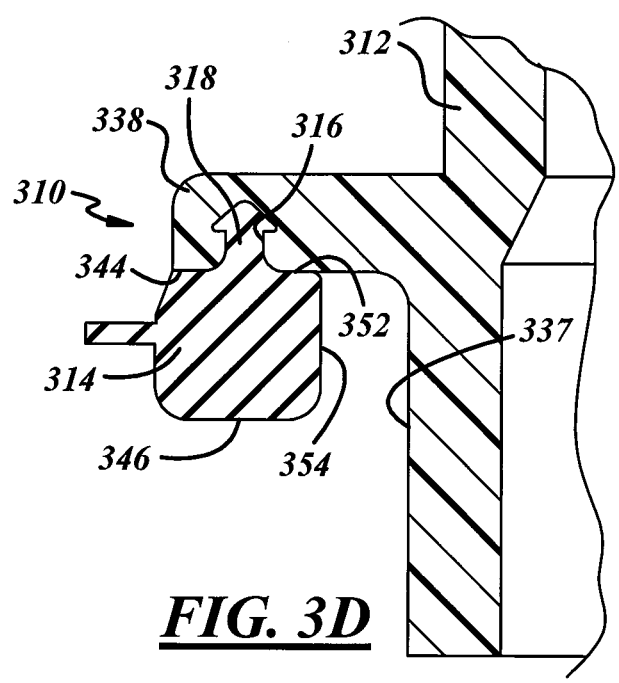
FIG. 3D is a fragmentary sectional view of a fourth example cover, showing a seal in a substantially uncompressed state.
Figure 4:
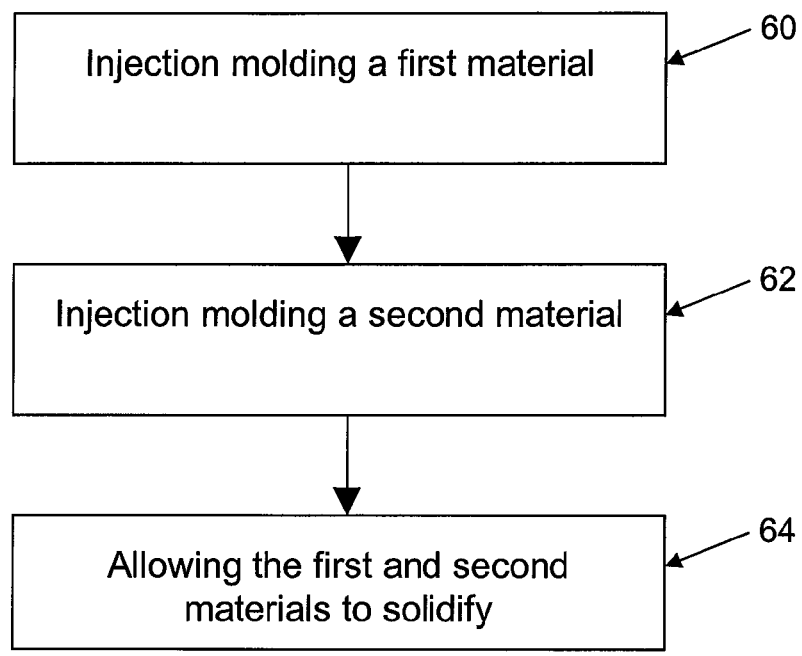
FIG. 4 is flowchart showing some of the steps used in forming a cover.

Referring in more detail to the drawings, FIGS. 2-4 show several examples of a plug or cover 10, and a method of forming the cover. The cover 10 can be used in a fuel system component such as a fuel tank, reservoir, or other component where fuel vapor may accumulate. In general, the cover 10 may form a pressure-tight and fluid-tight sealed joint at an opening defined in the particular fuel system component to prevent fuel vapor and fuel liquid from escaping through the opening. The cover 10 may include a body 12 and a seal 14 that may be molded together to form an integral component. The body 12 may have at least one first connecting feature 16, and the seal 14 may have at least one second connecting feature 18 that is shaped complementary to the first connecting feature. When the first and second connecting features 16 and 18 are connected or otherwise engaged, relative movement between the body 12 and the seal 14 such as twisting or rolling may be prevented or limited when the cover 10 is subjected to twisting, pulling, and frictional and compressional forces associated with, for example, installing and uninstalling the cover, and increased pressurized or vacuum conditions. Also, manufacturing and assembling processes may be simplified.

Referring to FIG. 1, a fuel tank assembly 20 holds and delivers liquid fuel to an associated internal combustion engine (not shown). In general, the fuel tank assembly 20 may include, among other components, a fuel tank 22 and a fuel delivery module 24 that may be installed in an opening 26 defined in a wall of the fuel tank 22. The fuel delivery module 24 may have a housing 28, a fuel filter 30, and a fuel pump 32. Skilled artisans will know the further components, and general construction, arrangement, and operation of similar fuel tank assemblies such that a more complete description will not be given here.

Referring to FIG. 2, the opening 26 may be defined in the fuel tank 22 to install the fuel delivery module 24 therethrough. As shown, the opening 26 may be slightly elevated and curled above a surrounding portion of the fuel tank 22 to form a lip 34. Although not shown, a locking or clamping ring device may be used with the lip 34 to hold the cover 10 over the opening 26. In other embodiments, the lip 34 may be absent where the opening 26 is simply defined in, and flush with, a substantially planar portion of the fuel tank 22, or an annular recess may be provided surrounding the opening in order to receive a seal.

Referring to FIGS. 2 and 3A, in this example of the cover 10, the body 12 may be constructed for being received in the opening 26, and may be designed to permit various components of the fuel delivery module 24 to pass-through and suspend from the body 12. The body 12 may be complementary in size and shape to the opening 26—in this case cylindrical. As described in more detail below, the body 12 may be made by a molding process, such as an injection molding process. As such, the body 12 may be composed of a material suitable for the molding process and suitable for use with fuel liquid and fuel vapor. Examples may include, but are not limited to, thermoplastics such as polystyrene, acrylonitrile butadiene styrene (ABS), polyamide (PA), polypropylene, polyethylene, polyvinyl chloride (PVC), and polyoxymethylene (POM). The body 12 may include an axial flange 36, a radial flange 38, and the first connecting feature 16.

The axial flange 36 may constitute a part of a periphery, or outer boundary of the body 12. The axial flange 36 may be circumferentially continuous and may include an outer or a side surface 37. The radial flange 38 may extend away from the axial flange 36 at any number of angles or orientations including perpendicular to the axial flange 36 as shown. The radial flange 38 may span radially and circumferentially continuously around the axial flange 36. The radial flange 38 may also include a top surface 42 and a bottom surface 44.

The first connecting feature 16 may be designed in a number of sizes, shapes, and orientations depending on, among other things, the desired strength of mechanical bond between the body 12 and the seal 14. As shown in FIGS. 2 and 3A, the first connecting feature 16 may include a plurality of recesses defined in the bottom surface 44 of the radial flange 38. The recesses may be bounded on three sides by the radial flange 38 to form a cylindrical or cup-like shape. The recesses 16 may be evenly spaced continuously along the bottom surface 44.

In this example, the seal 14 may bear against the lip 34 at the opening 26 to thus help contain fuel liquid and fuel vapors in the fuel tank 22. The seal 14 may be generally complementary in size, shape, and orientation to the periphery of the body 12—in this case, a ring-shape to constitute in this sense a ring seal; and in cross-section as shown in FIG. 2, the seal 14 may have a generally L-shape. The seal 14 may be circumferentially continuous and may include a radially extending portion and an axially extending skirt portion. As described in more detail below, the seal 14 may be made by a molding process, such as injection molding. The seal 14 may be composed of a material suitable for the molding process, and that may impart fuel liquid and fuel vapor impermeability and elasticity characteristics. Examples may include, but are not limited to, elastomers such as thermoplastic elastomers (TPE) like thermoplastic polyurethane copolymers, thermoplastic polyester copolymers, thermoplastic styrene copolymers, thermoplastic olefins, thermoplastic polyamide copolymers, and elastomeric alloys. The seal 14 may include a first sealing surface 46, a second sealing surface 48, an annular groove 50, an upper surface 52, an inner surface 54, the second connecting segment 18, and an appendage 58.

Referring to FIG. 2, when the cover 10 is mated in the opening 26, the first sealing surface 46 bears circumferentially continuously against a top surface of the lip 34 to form a first seal at the contiguous interface thereat. The first seal may be located, in cross-section, parallel to the bottom surface 44 of the radial flange 38. The second sealing surface 48, on the other hand, bears circumferentially continuously against an inside surface of the lip 34 to form a second seal at the contiguous interface thereat. As shown, the second seal may be located, in cross-section, parallel to the side surface 37 of the axial flange 36. Together, the first and second seals may prevent the escape of fuel liquid and fuel vapor between the opening 26 and the cover 10.

The annular groove 50 may be circumferentially continuous and may be located between the first and second sealing surfaces 46 and 48. The annular groove 50 may provide space to increase the flexibility of the seal 14 when the cover 10 is mated with the opening 26. The annular groove 50 may also help prevent damage to the seal 14 at the corner of the lip 34.

The upper surface 52 and the inner surface 54 may correspond in shape to the respective surfaces of the body 12. That is, the upper surface 52 may be flush with and may be adhered to the bottom surface 44 of the radial flange 38, and the inner surface 54 may similarly be flush with and adhered to the side surface 37 of the axial flange 36.

The second connecting feature 18 may be designed complementary or inverse to the first connecting feature 16 as shown, and may be received therein to form a mechanical bond (a chemical bond with a mechanically interlocked molecular architecture) between the body 12 and the seal 14. Indeed, the second connecting feature 18 may be formed during the molding process by material filling the first connecting feature 16; and thus its size, shape, and orientation may depend on the respective size, shape, and orientation of the first connecting feature 16. In some cases, no chemical bond is formed between the body 12 and the seal 14. As shown, the second connecting feature 18 may extend from the upper surface 52 and may have a cylindrical shape matching that of the first connecting feature 16.

The appendage 58 may serve as a visual aid when the cover 10 is being mated with the opening 26. For example, the appendage 58 may project radially beyond the radial flange 38 so that it is visible when viewing the cover 10 from the top (axially with respect to the body 12) when the cover 10 is being placed in the opening 26. This way an assembler can see if the seal 14 is aligned properly with respect to the body 12, and if and when the seal 14 becomes inadvertently detached.

The cover 10—including the body 12 and the seal 14—may be manufactured by a molding process, such as an injection molding process to produce an integral part. The part is integral in the sense that the body 12 and the seal 14 are joined together to constitute the cover 10 after the molding process. That is, they are joined together mechanically by the interengaged first connecting feature 16 and second connecting feature 18. Despite such joining, the body 12 and the seal 14 may not be permanently fixed to each other. For example, the seal 14 may be detached from the body 12 when opposing forces are exerted thereat—this may also be true in the cases where no chemical bond is formed. This may be desirable to replace a damaged or otherwise ineffective seal after use.

Skilled artisans will appreciate that the exact injection molding process used may vary in equipment, steps, specifications, and the like; and may depend in part on the materials used, geometry of the part, and the like. FIG. 4 shows an example process. In a step 60, a measured quantity of a first material in molten form is injected into a cavity in a die of a predetermined shape that forms the body 12. The predetermined shape may form the radial flange 38 and the first connecting feature 16. In some embodiments, at least a portion of the first material may be allowed to cool, or at least partially solidify, before a step 62. In the step 62, a measured quantity of a second material in molten form is injected into a cavity in a predetermined shape that forms the seal 14. The second material is injected adjacent the periphery of the body 12 such that the second material contacts the first connecting feature 16 to either fill or surround the first connecting feature 16, as the case may be. Such contact ensures a complementary shape and a tight tolerance between the first connecting feature 16 and the second connecting feature 18. In a step 64, the first and second materials are allowed to solidify completely to form the cover 10. The cover 10 can then be removed from the die. Skilled artisans will know the more detailed steps of similar injection molding processes such that a more complete description will not be given here. One example injection molding machine may form a first cavity for the body 12, and may have a slider that rotates or moves to form a second cavity for the seal 14. In another example process, a first injection molding machine forms the body 12, and then the body is placed in a second injection molding machine to form the seal 14.

FIG. 3B shows a second example embodiment of a cover 110. This example embodiment is similar to the first example embodiment in many respects, and the similarities will not be repeated here. At least one difference is a plurality of first connecting features and a plurality of second connecting features. The first connecting features may comprise recesses 116 that may be defined in a bottom surface 144 of a radial flange 138 of a body 112. The recesses 116 may be bounded on three sides by the radial flange 138 to form an elongated arcuate or straight shape. The recesses 116 may be evenly spaced continuously along the bottom surface 144. The second connecting features may comprise projections 118 that may extend axially from an upper surface 152 of a seal 114 and may have an elongated shape complementary to that of the recesses 116. The projections 118 may be evenly spaced circumferentially along the upper surface 152 and aligned with the recesses 116 so that they may be received in the recesses to form a mechanical bond between the body 112 and the seal 114. As before, the cover 110—including the body 112 and the seal 114—may be manufactured by a molding process, such as an injection molding process, to produce an integral part.

FIG. 3C shows a third example embodiment of a cover 210. This example embodiment is similar to the first example embodiment in many respects, and the similarities will not be repeated here. At least one difference is the shape of a plurality of first connecting features and the shape of a plurality of second connecting features. The first connecting features may comprise recesses 216 that may be defined in a bottom surface 244 of a radial flange 238 of a body 212. The recesses 216 may be bounded by the radial flange 238 to form a non-uniform cross-section, having a first section and a second section that is enlarged as compared to the first section; the recesses 216 may resemble a rivet. The recesses 216 may be evenly spaced continuously along the bottom surface 244. The second connecting features may comprise projections 218 that may extend axially from an upper surface 252 of a seal 214 and may have a shape complementary to that of the recesses 216; that is, the projections 218 may have a stem end and a terminal head, thus resembling a rivet. The projections 218 may be evenly spaced circumferentially along the upper surface 252 and may be aligned with the recesses 216 so that they may be received in the recesses to form a mechanical bond between the body 212 and the seal 214. As shown, the projections 218 may be caught in the recesses 216, but still may be removed therefrom so that the seal 214 can be detached from the body 212. As before, the cover 210—including the body 212 and the seal 214—may be manufactured by a molding process, such as an injection molding process, to produce an integral part. In one example injection molding process, a pin (not shown) with an expanding and contracting head may be used to form the rivet shape of the recesses 216.

FIG. 3D shows a fourth example embodiment of a cover 310. This example embodiment is similar to the first example embodiment in many respects, and the similarities will not be repeated here. At least one difference is the shape of a seal 314. When the cover 310 is mated in an opening (not shown), a sealing surface 346 bears circumferentially continuously against an adjacent surface of the associated fuel tank to form a seal at the fuel tank. The seal may be located, in cross-section, parallel to a bottom surface 344 of a radial flange 338. An upper surface 352 of the seal 314 may be flush with, and may be adhered to part of the bottom surface 344 of the radial flange 338. An inner surface 354, on the other hand, may be spaced from and not in contact with any part of a body 312. A plurality of first connecting features in the form of recesses 316 and a plurality of complementary second connecting features in the form of projections 318 may be similar to those described in FIG. 3C. As before, the cover 310—including the body 312 and the seal 314—may be manufactured by a molding process, such as an injection molding process, to produce an integral part. Here, one difference is that only the portion shown is molded to the radial flange 338, and no part of the seal 314 is molded to a side surface 337 of the body 312.

Although not particularly shown or described, subject matter of each of the several example embodiments may be used with each other. For example, the seal of FIG. 3D may have the projections of FIG. 3A. And further, embodiments are possible that have not been shown or described at all. For example, a single circumferentially continuous arcuate recess may be defined in the radial flange to fit a single complementary projection. Likewise, the recesses may be oriented along the circumference in a zig-zag path on the bottom surface of the radial flange, in a curvilinear path, or the like. Moreover, the first connecting feature may be any one of the above described projections, while the second connecting feature may be any one of the above complementary recesses.

In at least some embodiments, molding the body and seal may allow tighter tolerances between the body and the seal. The seal may be molded intimately to the exact contour of the body. Such an intimate fit may effectively eliminate an escape route for fuel liquid and fuel vapor between the body and the seal, leaving only one possible route between the seal and the fuel tank. Also, the intimate fit and described mechanical bond may result in increased resistance to pressure burst or blow-out when the seal is subjected to a pressurized condition, and may also result in increased resistance to twisting or rolling when the cover with the seal is being assembled or when it is subjected to a vacuum condition. Furthermore, because the cover is an integral part (i.e., no separate body and seal parts), there are less parts to subsequently assemble and less possibility for assembly problems such as misalignment between the body and the seal. Moreover, the molding process may increase efficiency in some of the manufacturing steps.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:
1. A cover for an opening in a fuel system component, the cover comprising:

a one-piece body of a first thermoplastic material constructed so that when assembled to a fuel system component the body has a central portion that extends over at least part of and closes an opening in the fuel system component, a homogeneously integral peripheral flange extending radially outwardly of the opening and having a generally radially extending bottom surface of the flange adjacent the fuel system component, at least one first connecting feature having a recess in the peripheral flange, the recess having a non-uniform section with a first portion of the section opening both through the bottom surface of the peripheral flange and into a second portion of the section within the peripheral flange that is radially enlarged relative to the first portion of the section and communicating within the peripheral flange with the first portion of the section, and an axial flange having a circumferentially continuous side surface extending generally axially relative to the bottom surface, and a circumferentially continuous seal ring of an elastomer different than the first thermoplastic material and at least chemically bonded with a mechanically interlocked molecular architecture circumferentially continuously to the bottom surface and circumferentially continuously to the side surface and providing a first annular sealing surface to bear against the fuel system component radially outwardly of the opening when the cover is mated therewith, and a second sealing surface to bear on a generally axially extending surface defining the periphery of the opening in the fuel system component, and the seal ring having at least one second integral connecting feature extending into, engaging, molded into and complimentary with the recess and having a stem projecting from the ring seal and terminating in a homogenously integral head projecting from the stem and radially enlarged relative to the stem, the stem received in, filling and engaging the first portion of the section and the homogenously integral enlarged head received in, filling and engaging the second portion of the section to at least mechanically connect the flange of the body and the seal ring together.

2. The cover of claim 1 wherein the seal ring is composed of a thermoplastic elastomer.

3. A cover for an opening in a fuel system component, the cover comprising:

a one-piece body of a first thermoplastic material constructed so that when assembled to a fuel system component the body has a central portion that extends over at least part of and closes an opening in the fuel system component, a homogeneously integral radial flange extending radially outwardly of the opening and having a generally radially extending bottom surface of the radial flange adjacent the fuel system component, and at least one first connecting feature having a recess in the radial flange, the recess having a non-uniform section with a first portion of the section opening both through the bottom surface of the radial flange and into a second portion of the section within the radial flange that is radially enlarged relative to the first portion of the section and communicating within the radial flange with the first portion of the section; and a circumferentially continuous seal ring of an elastomer different than the first thermoplastic material and at least mechanically bonded to the bottom surface of the radial flange of the body and around the periphery providing an annular sealing surface to bear against the fuel system component outwardly of the opening when the cover is mated therewith, the seal ring having at least one second integral connecting feature extending into, engaging and complimentary with the recess and having a stem projecting from the ring seal and terminating in a homogenously integral head projecting from the stem and radially enlarged relative to the stem, the stem received in and engaging the first portion of the section and the homogenously integral enlarged head received in and engaging the second portion of the section to at least mechanically connect the radial flange of the body and the seal ring together; and the body further comprises an axial flange having a side surface extending axially of the radial flange and in assembly projecting into the opening, and wherein the seal is injection molded circumferentially to both the bottom surface and to the side surface to constitute an integral part of the cover, and wherein, when the cover is mated with the opening, the seal bears against the fuel system component to form a first seal that, in cross-section, is parallel to the bottom surface, and the seal bears against the fuel system component to form a second seal that, in cross-section, is parallel to the side surface.

4. The cover of claim 3 wherein the at least one first connecting feature comprises a plurality of cylindrical recesses spaced along and defined in the bottom surface of the radial flange, and wherein the at least one second connecting feature comprises a plurality of complementary projections, with each projection received in a respective one of the plurality of cylindrical recesses.

5. The cover of claim 3 wherein the at least one first connecting feature comprises a plurality of arcuate recesses spaced along and defined in the bottom surface of the radial flange, and wherein the at least one second connecting feature comprises a plurality of complementary projections, with each projection received in a respective one of the plurality of arcuate recesses.

6. The cover of claim 3 wherein the at least one first connecting feature comprises a plurality of recesses that are spaced along and defined in the bottom surface of the radial flange, each recess having a first section and a second section that is enlarged as compared to the first section, and wherein the at least one second connecting feature comprises a plurality of complementary projections, each projection having a stem and an enlarged terminal head, with each projection being received in a respective one of the plurality of recesses.

7. The cover of claim 3 wherein the seal comprises an appendage extending radially beyond the radial flange to act as a visual aid when mating the cover with the opening of the fuel system component.

8. The cover of claim 3 wherein the seal ring is composed of a thermoplastic elastomer.

9. The cover of claim 3 wherein the first thermoplastic material is at least one of acrylonitrile butadiene styrene (ABS), polyamide (PA), polypropylene, polyethylene, polyvinyl chloride (PVC), or polyoxymethylene (POM).

10. The cover of claim 3 wherein the elastomer is at least one of thermoplastic polyurethane copolymers, thermoplastic polyester copolymers, thermoplastic styrene copolymers, thermoplastic olefins, thermoplastic polyamide copolymers, or thermoplastic elastomeric alloys.

11. The cover of claim 9 wherein the elastomer is at least one of thermoplastic polyurethane copolymers, thermoplastic polyester copolymers, thermoplastic styrene copolymers, thermoplastic olefins, thermoplastic polyamide copolymers, or thermoplastic elastomeric alloys.

12. An assembly, comprising:

a fuel system component defining an opening;

a separate one-piece cover of a first thermoplastic material having a central portion that extends over at least part of and closes the opening, a homogeneously integral peripheral flange extending radially outwardly of the opening and having a bottom surface adjacent the fuel system component, at least one first connecting feature having a recess in the peripheral flange, the recess having a non-uniform section with a first portion of the section opening both through the bottom surface of the flange and into a second portion of the section within the flange that is radially enlarged relative to the first portion of the section and communicating within the peripheral flange with the first portion of the section, and an axial flange with a side surface extending axially of the bottom surface; and a circumferentially continuous seal ring of a second thermoplastic material different than the first thermoplastic material, having at least one second connecting feature integral with and extending from the seal rine and complimentary to and received in the at least one first connecting feature, and at least mechanically bonded to and extending circumferentially around the bottom surface and at least mechanically bonded to and extending circumferentially around and axially along at least part of the side surface to bond the seal ring to the side and bottom surfaces and constitute an integral part of the cover, and wherein, when the cover is mated with the opening, the seal ring bears against the fuel system component to form a first seal that, in cross-section, is parallel to the bottom surface, and to form a second seal that, in cross-section, is parallel to the side surface and bears on an axial surface of the perimeter of the opening in the fuel system component.

13. The assembly of claim 12 wherein the at least one first connecting feature comprises a plurality of recesses spaced along and defined in the bottom surface of the radial flange, and wherein the at least one second connecting feature comprises a plurality of complementary projections, with each projection being received in a respective one of the plurality of recesses.

14. The assembly of claim 13 wherein each of the plurality of recesses is cylindrically shaped.

15. The assembly of claim 12 wherein the at least one first connecting feature comprises a plurality of arcuate recesses spaced along and defined in the bottom surface of the radial flange, and wherein the at least one second connecting feature comprises a plurality of complementary projections, with each projection received in a respective one of the plurality of arcuate recesses.

16. The assembly of claim 12 wherein the at least one first connecting feature comprises a plurality of recesses that are spaced along and defined in the bottom surface of the radial flange, each recess having a first section and a second section that is enlarged as compared to the first section, and wherein the at least one second connecting feature comprises a plurality of complementary projections, each projection having a stem and an enlarged terminal head, with each projection being received in a respective one of the plurality of recesses.

17. The assembly of claim 12 wherein the seal comprises an appendage extending radially beyond the radial flange to act as a visual aid when mating the cover with the opening.

18. The cover of claim 12 wherein the seal ring of the elastomer is at least chemically bonded with a mechanically interlocked molecular architecture to the cover of the first thermoplastic material.

\* \* \* \* \*